UNITED STATES PATENT OFFICE.

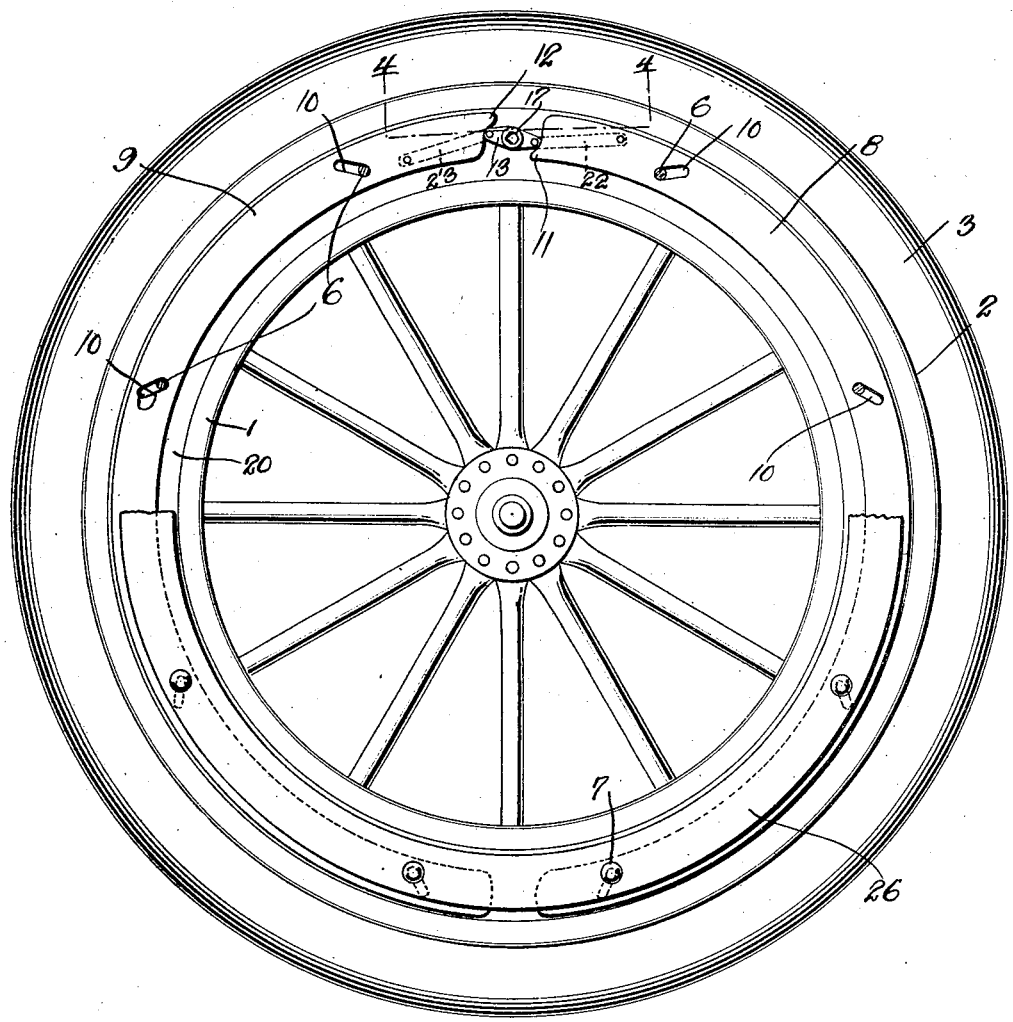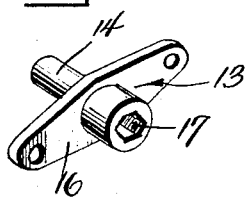

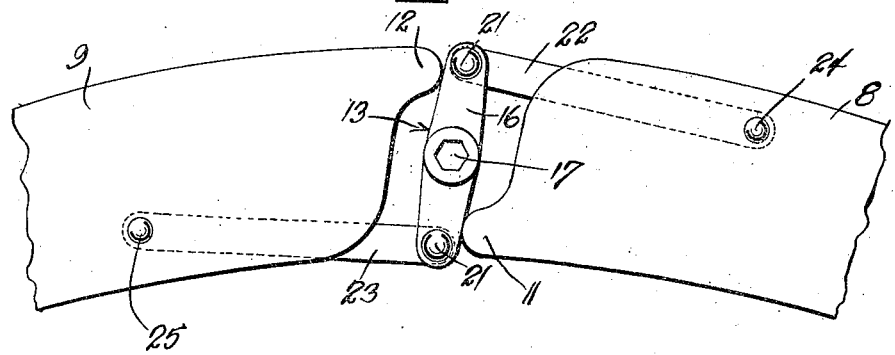
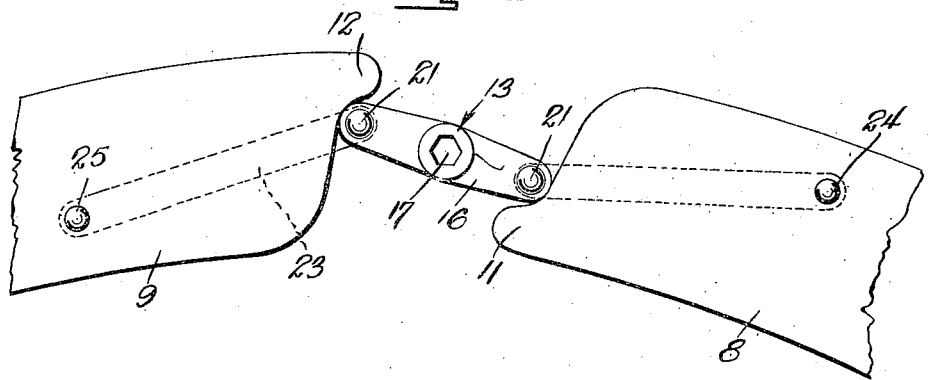
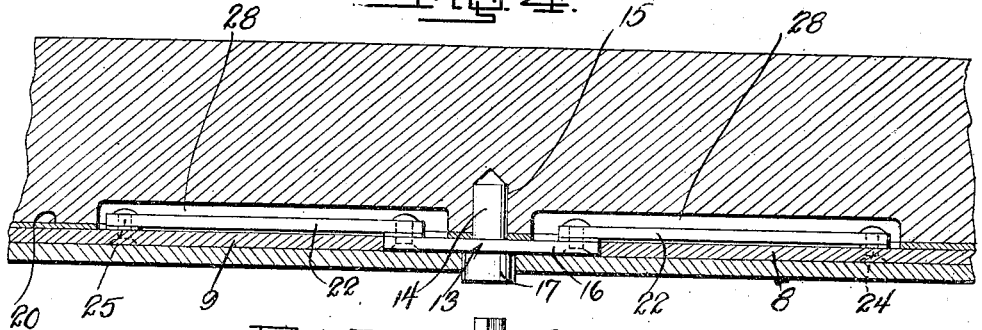
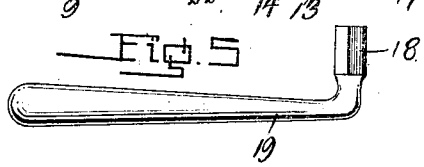

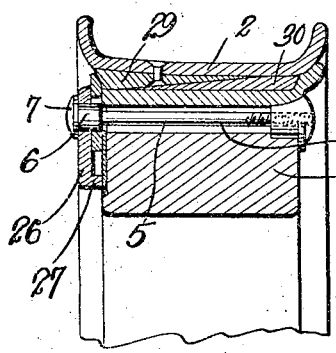
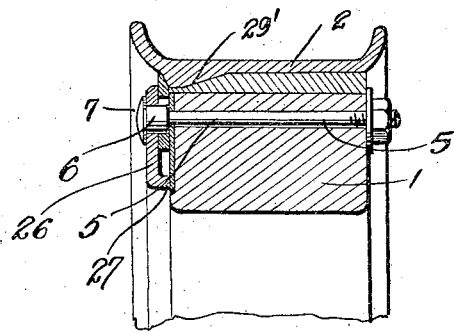
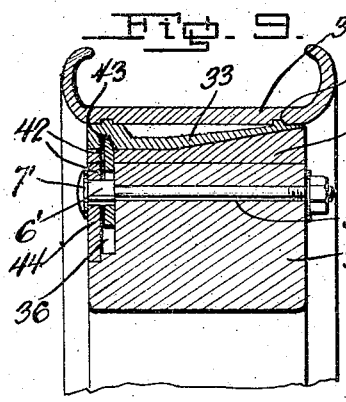
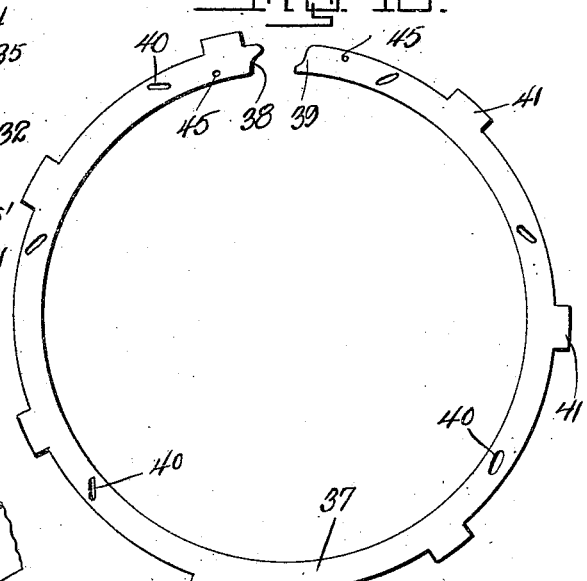
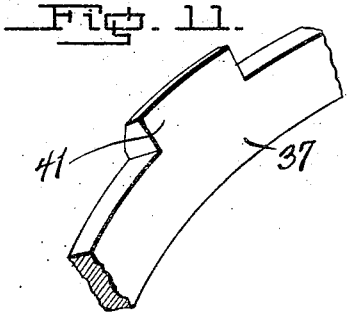

EDWARD O. COATS, OF POSTOAK, MISSOURI, ASSIGNOR OF ONE-HALF TO GRIFFIN LEROY HALL, OF LEETON, MISSOURI.

DEMOUNTABLE RIM FOR VEHICLE-WHEELS.

1,381,168.     Specification of Letters Patent.    Patented June 14, 1921.

Application filed November 5, 1917. Serial No. 200,417.

*To all whom it may concern:*

Be it known that I, EDWARD O. COATS, a citizen of the United States, and a resident of Postoak, in the county of Johnson and State of Missouri, have invented certain new and useful Improvements in Demountable Rims for Vehicle-Wheels, of which the following is a specification.

This invention relates to demountable rims for vehicle wheels and more particularly to an efficient device for releasably holding a demountable rim in position on the wheel felly in a manner that will admit of the rim being easily demounted when desired.

The primary object of the invention is to provide a device of this character which will obviate the necessity of using fastening bolts, nuts or wedges such as are now generally employed for holding demountable rims and which require considerable time to remove or loosen when the rim is to be taken off the wheel felly.

My invention also aims at the provision of a demountable rim retaining means adapted to be operated by a single partial turn of an operating crank or instrument for either removing the rim or placing the device in position for holding the rim in operative position.

As a further object of the invention the device includes a radially expansible and contractile element associated with the vehicle wheel in a manner that will permit engagement and disengagement with the rim as desired.

A further object of the invention is the provision of a device of this character which consists of comparatively few parts and is simple in construction, but durable and especially adapted to withstand the rough usage to which devices of this kind are ordinarily subjected.

For a full description of the invention and advantages and merits thereof, reference is to be had to the following detailed description and the accompanying drawing wherein is illustrated the preferred form of the invention, and in which:

Figure 1 is a side elevation of a vehicle wheel showing my invention applied thereto.

Fig. 2 is a fragmentary elevation of a portion of the invention showing the meeting ends of the retaining element in the position they assume when the rim is to be demounted.

Fig. 3 is a similar view showing the ends of the retaining element in the position they assume when the rim is mounted and held in place on the wheel felly.

Fig. 4 is an enlarged fragmentary section taken substantially on the line 4—4 of Fig. 1.

Fig. 5 is a view of the operating crank.

Fig. 6 is a detail perspective view of a part of the invention.

Fig. 7 is a transverse section through a common type of wheel rim showing the invention applied thereto.

Fig. 8 is a similar view through a different type of wheel rim also having the invention applied.

Fig. 9 is a transverse section through a still further type of rim showing the application of a modified form of the invention.

Fig. 10 is a front elevation of a modified form of the retaining element as used with the form shown in Fig. 9 and Fig. 11 is an enlarged perspective of a fragment of this retaining element.

Referring to the drawing, and particularly to Figs. 1 to 8, the vehicle wheel includes the spokes which support the wheel felly 1 upon which the rim 2 is mounted for receiving the pneumatic tire 3. In this connection it might be stated that the device is not limited to the use of rims having pneumatic tires but may be adapted for use with vehicle wheels of any type employing either pneumatic or solid tires. The felly 1 is provided with a plurality of circumferentially spaced openings 4 extending transversely through the felly and through which bolts 5 are passed. The ends of the bolts are extended beyond the side of the felly and the extended end is enlarged in diameter to form a stud 6 on each bolt. This stud 6 terminates in a head 7 and the opposite end of the bolt is provided with screw-threads for reception of a nut or other suitable fastening element whereby the bolt and stud is held in position.

The retaining element comprises a ring divided into substantially semi-circular sections 8 and 9 and these sections are provided with tangential slots 10 properly spaced apart to receive the studs 6. The inner ends of the slots receive the studs when the retaining element is in operative position to retain the demountable rim in position on the felly. The sectons 8 and 9 are constructed of comparatively thin material and are adapted to be radially flexed and they possess sufficient resiliency to permit them to be radially expanded and contracted as will hereinafter appear.

As shown to advantage in Figs. 1, 2 and 3 of the drawing, two of the proximate ends of the sections 8 and 9 are provided with projections 11 and 12, the projection 11 on the section 8 being at the end of the inner edge of the section and the projection 12 on the section 9 being at the end of the outer edge of the section. These two projections 11 and 12 form fingers and are adapted to be engaged by the ends of a spreader bar 13. This spreader bar, shown in detail in Fig. 6 of the drawing, includes the stem 14 adapted to fit in a recess 15 in the wheel felly so that the spreader bar may be rotated. The main portion of the spreader bar includes a link 16 having its ends projecting in opposite direction while integrally formed with this link is an outwardly projecting cylindrical portion having its center recessed to provide a socket 17 which may be square, hexagonal or any other desired shape to receive the correspondingly shaped end 18 of an operating crank 19. It will be understood, however, that any preferred type of instrument may be employed for turning the spreader bar by fitting it into the socket 17 for imparting a rotary motion thereto. The side of the felly upon which the device is mounted is provided with a wearing plate 20 sunk into the felly and extending around the side face thereof so that the movement of the sections 8 and 9 will prevent injury being done to the felly itself.

This plate 20 is provided with suitable openings through which the studs 6 project. The ends of the portions 16 of the spreader bar are provided with apertures for the reception of connecting pins 21 which also receive the ends of the connecting levers 22 and 23. The connecting lever 22 is pivotally connected by a pin 24 to the section 8 near one end thereof and at a point near the outer marginal edge as shown in Figs. 1, 2 and 3. The connecting lever 23 is pivotally connected by a pin 25 to the section 9 at a point near the inner edge of the same. These levers 22 and 23 act to move the sections 8 and 9 into expanded or contracted positions when the spreader bar is rotated.

Overlapping the sections 8 and 9 of the retaining ring is a cover plate 26 which is constructed from an annular ring having its inner marginal edge provided with a lip 27 adapted to engage the plate 20 so that the space between the plate 26 and the plate 20 is provided for the reception of the retaining ring. This plate 26, embracing the sections 8 and 9, is provided with circumferentially spaced openings through which the studs 6 project and the heads 7 of the studs engage the outer surface of the plate 26 to maintain the latter in position. This plate confines the movable sections 8 and 9 through radial movement and it will be obvious that these sections will be prevented from flexing outwardly when they are contracted or expanded. Sufficient space is provided between the inner marginal edges of the sections and the lip 27 to permit the sections to contract when the rim is to be demounted. As shown in Fig. 4 of the drawing, the felly is recessed as at 28 and the plate 20 is provided with corresponding openings whereby the connecting levers 22 and 23 may be properly disposed on the inner surfaces of the sections 8 and 9. These recesses 28 are large enough to permit free movement of the connecting levers when the mechanism is operated.

Referring specifically to Fig. 7 of the drawing, it will be noted that the felly 1 has the demountable rim 2 and the latter carries a wedge-shaped portion 29 which is riveted to the rim and extends around the inner surface of the same and snugly engages an annular section 30 which is also wedge-shaped in cross-section and is carried by the felly 1. The outer edge of the annular wedge 29 forms an abutment against which the sections 8 and 9 contact when the latter are in operated position. The outer marginal edges of the sections are slightly beveled to conform to the beveled edge of the wedge portion 29. In Fig. 8, the rim 2 has the annular wedge-shaped portion 29′ integrally formed with the rim as differentiated from the riveted portion shown in Fig. 7 and this annular wedge-shaped portion 29′ provides an abutment with which the retaining sections 8 and 9 contact when in operative position.

When the various parts are assembled upon the wheel in the manner above described, and it is necessary to remove the rim from the wheel felly, the operator will place the end 18 of the crank 19 in the socket 17. It is to be noted that when the sections are in operative position for retaining the rim, the spreader bar 13 is disposed in a position whereby the link 16 extends substantially tangentially. By giving a quarter turn to the handle 19 of the crank, the plate 16 is moved so that it extends substantially radially and this action draws the proximate ends of the sections 8 and 9 at this point toward each other through the medium of the connecting levers 22 and 23. This action will radially flex the sections and the slots 10 will permit sufficient movement to cause the outer edges of the sections to disengage the abutments on the rim and, since the outer diameter is materially decreased by this action, the demountable rim may be removed from the felly. When the rim is replaced, it is merely necessary to turn the crank until the link 16 is moved to the position shown in Figs. 1 and 3 and this movement will cause the ends of the link to contact with the fingers formed by the extensions 11 and 12 and the pressure against the proximate ends of the sections will maintain them in expanded position.

In Figs. 9, 10 and 11 of the drawing, I have illustrated a slightly modified form of the invention. The felly 31 carries the annular band 32 upon which a removable ring 33 is mounted. The demountable rim 34 is mounted upon this ring 33 and the inner surface of the rim is provided with annular recesses for the reception of annular ribs 35 which hold the rim to the ring when the same is mounted upon the wheel felly. One side of the felly, upon which the retaining element is mounted, is provided with an annular channel 36 and the bolts 5' are extended through openings in the felly and the studs 6' extend through the channel so that the head 7' of the stud is flush with the outer surface of the felly. The retaining element in this form comprises the ring 37 which has a portion removed to provide the open space between the ends 38 and 39. This ring is provided with tangential slots 40 which receive the studs 6' and the ring is placed in the bottom of the channel to thus mount it upon the studs. At circumferentially spaced intervals on the outer margin of the ring, I have provided a series of locking tongues 41 and the band 32 and the ring 33 are adapted to receive these tongues when the retaining element is expanded. As shown in Fig. 9, the band 32 is provided with the slots 42 while an enlarged portion of the ring 33 is recessed as at 43 thus permitting the corresponding tongue 41 to project through and be received in the recess. The cover plate 44, corresponding to the plate 26 in the above described form, overlies the ring 37 and is engaged by the heads 7', the plate being provided with suitable openings through which the studs 6 project. The openings 45 in the proximate ends of the ring are for the reception of the pins 24 and 25 whereby connection of the ends of the ring may be made with the levers 22 and 23 to connect the ends to the spreader bar. When the spreader bar is operated to release the rim, the ends of the ring will be moved toward each other and the tongues 41 will be disengaged from the recesses 43 in the ring 33 and the rim may be thus laterally removed from the band 32. The recesses 43 have one of their annular side walls arranged at an angle while the corresponding side of each tongue 41 is beveled to facilitate register of the tongues with the recesses.

From the foregoing, it will be observed that a very simple and durable apparatus for retaining a demountable rim in position has been provided, the details of which embody the preferred form. I desire to be understood, however, that slight changes may be made in the details of construction without departing from the spirit or the scope of the claims hereunto appended:—

What is claimed is:—

1. The combination with a wheel, and a demountable rim mounted upon the wheel felly, of a retaining element comprising a pair of substantially semi-circular sections, two of the proximate ends of said sections containing projections and being spaced apart, and adapted to be moved toward and away from each other for contraction and expansion, a spreader pivotally mounted intermediate said ends, and projecting laterally from the wheel, links pivotally connecting said spreader with each of said proximate ends, said spreader adapted to abut against the proximate ends to be rotated, to force said ends apart to expand the rim, said rim when expanded in such position having the pivoted links connected to said spreader past dead center, and the ends of the spreader abutting the projections on the sections.

2. In a demountable rim, the combination with a vehicle wheel, of a pair of independent ring sections, means for expanding said independent ring sections, and a circular cover plate adapted for mounting over said ring sections, as an inclosure therefor to properly guide said ring sections during operation of expansion and contraction.

3. In a demountable rim, the combination, with a vehicle wheel, of a split retaining ring, the split ends of said ring having projections extending outwardly therefrom, and a link oscillatively carried by said vehicle wheel adapted to engage said end projections to maintain the retaining ring in expanded position.

4. In a demountable rim, the combination, with a vehicle wheel, of a split retaining ring, the split ends of which ring have projections thereon, a link oscillatively connected intermediate said spaced ends to the vehicle wheel, connecting levers connecting opposite ends of said link, one of said levers adapted to engage each end of said retaining ring, so that upon oscillation of the link said levers will expand and contract the retaining ring, said link when the ring is expanded adapted to have opposite ends thereof engaging the projections upon the ends of said retaining ring for maintaining said retaining ring expanded.

EDWARD O. COATS.